L. L. MOULTON.
EDUCATIONAL DEVICE.
APPLICATION FILED JULY 19, 1913.

1,113,237.

Patented Oct. 13, 1914.

Witnesses:
Carl L. Choate
Horace A. Crossman

Inventor:
Lizzie L. Moulton
by Emery, Booth, Janney & Varney
Attys.

UNITED STATES PATENT OFFICE.

LIZZIE L. MOULTON, OF BOSTON, MASSACHUSETTS.

EDUCATIONAL DEVICE.

1,113,237.  Specification of Letters Patent.  Patented Oct. 13, 1914.

Application filed July 19, 1913.  Serial No. 779,944.

*To all whom it may concern:*

Be it known that I, LIZZIE L. MOULTON, a citizen of the United States, and resident of Boston, Massachusetts, have invented an Improvement in Educational Devices, of which the following description, in connection with the accompanying drawings, is a specification, like characters on the drawings representing like parts.

This invention relates to educational devices, and more particularly to a device for facilitating the explanation to children of the phases of the calendar.

Figures 1, 3:
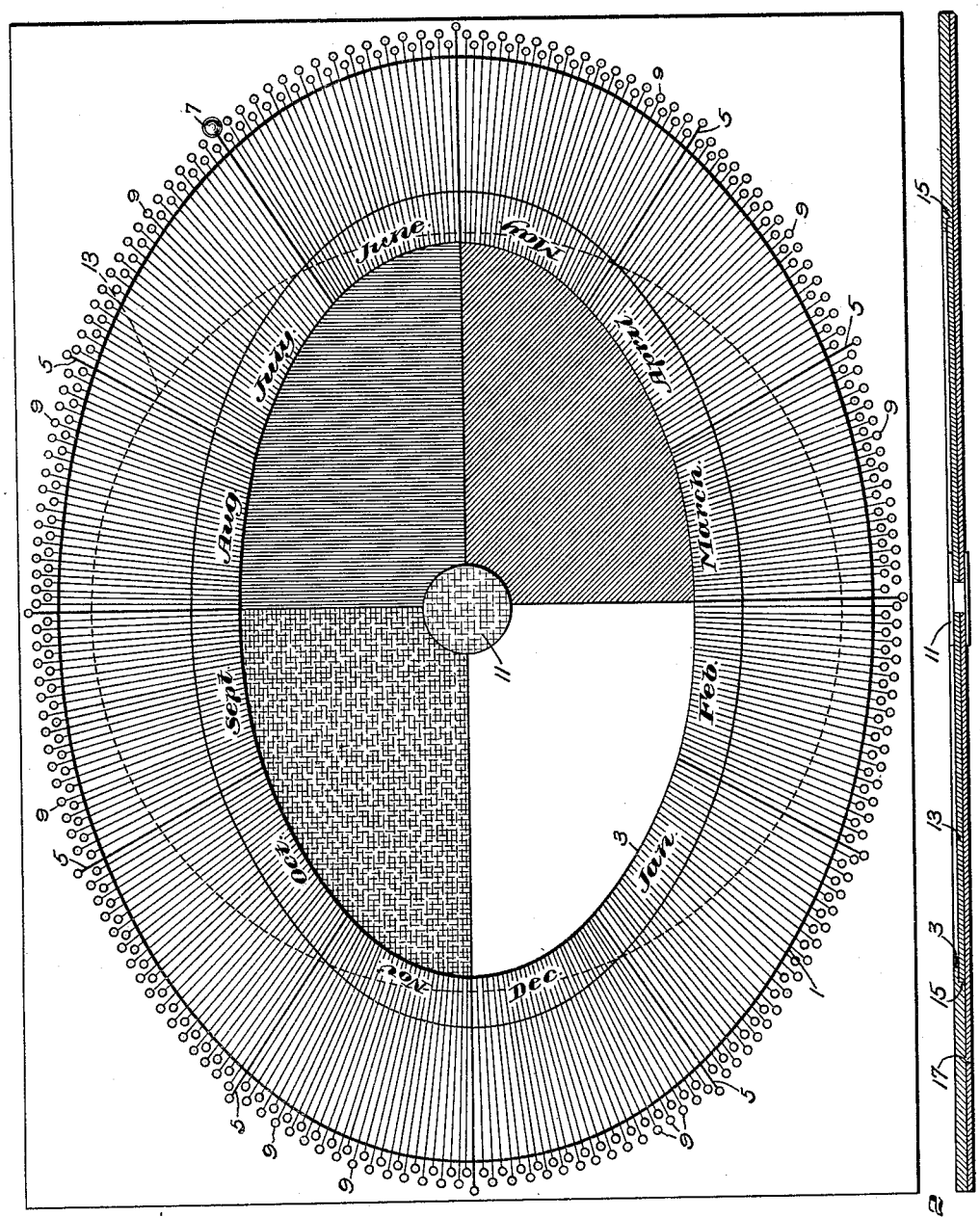
Figure 2:

The character of the invention may be best understood by reference to the following description of an illustrative embodiment thereof shown in the accompanying drawing, wherein:

Figure 1 is a plan of an illustrative educational device shown herein as embodying the invention; Fig. 2 is a central vertical section through the device shown in Fig. 1; and Fig. 3 is a detail to be referred to.

Referring to the drawing, the illustrative educational device there shown as embodying the invention comprises a chart on a board of thin wood or other suitable material, said chart comprising concentric elliptic lines 1 and 3 forming between them a space representing the earth's orbit. This space is divided radially into twelve sections representing the months of the year and having marked thereon the names of the months. Each section may be partly blue and partly gray, if desired, suggestive of the blue and gray skies throughout the year. Each of the month sections is divided by graduation marks 5 to represent the days of the month. To indicate or register any selected day a peg 7 or other appropriate member may be provided having a head thereon in the form of a ball representing the earth. This earth ball may be inserted progressively in holes 9 in the chart board corresponding with the days graduations. Centrally within the earth's orbit is located a disk-like member 11, preferably yellow in color, representing the sun. By the relative arrangement of the earth ball and sun the idea of the travel of the earth in an elliptical orbit about the sun is forcibly impressed upon the child's mind.

To enable the child to readily understand the division of the months of the year into seasons, a disk or member 13 of thin wood or other material is provided within the inner ellipse line of the earth's orbit, said member being divided into four segments preferably chromatically differentiated from one another to represent the seasons. A convenient selection of appropriate colors for this purpose comprises—green, suggestive of the verdant character of the spring months; red, suggestive of the hot summer months; yellow, suggestive of the fading vegetation of the fall months; and white, suggestive of the snow-covered ground characteristic of the winter months.

In order to impress upon the mind of the child the duration of the respective seasons, the season segments are coextensive with the sections comprising the months included in the seasons. More specifically, the lines bounding the spring segment register with the lines marking the commencement of March and the end of May; the lines bounding the summer segment register with the lines marking the commencement of June and end of August; the lines marking the boundaries of the autumn segment register with the lines marking the commencement of September and end of November; and the lines marking the boundaries of the winter segment are of an extent sufficient to register with the lines marking the commencement of December and end of February.

While the months of March, April and May are regarded as the spring months, yet from a strict astronomical point of view the spring season does not commence on the first of March and end on the first of June, but commences on the 21st of March and ends on the 21st of June. In order to make this clear to the child the central season representing member is made adjustable so that a segment thereof may be moved to bring its boundaries into registration with the day graduations corresponding to March 21st and June 21st. Similarly the summer, autumn and winter segments are at the same time adjusted to register with the day graduations marking the exact boundaries of said seasons.

It will be observed that the portion of the season segment member visible within the inner orbit line is elliptical. If this elliptical member fitted into an oval aperture formed by the inner line of the orbit, obviously it could not receive the rotative adjustment described. To enable it to have this rotative adjustment it may be on a portion of the disk 13, the latter being conveniently seated in a counter-bore 15 on the under face of the chart board. This disk may be retained in this counter-bore by a base strip 17 of thin wood veneer or other suitable material glued or otherwise secured to the chart board. The disk is placed in said counter-bore with a fit appropriate to permit the ready adjustment thereof by applying the hand to the upper face thereof and imparting a rotative movement thereto.

It is a well known fact that objects make a more forcible impression on a child's mind than mere words. The educational device described constitutes an objective representation of phases of the calendar and as a result materially assists in enabling the child to understand and remember the same.

It is to be understood that the particular embodiment of the invention described herein is selected for purposes of illustration and that the invention might be variously embodied without departing from the spirit and scope thereof.

What I claim as new and desire to secure by Letters Patent is:

1. An educational device comprising, in combination, a chart having the earth's orbit marked thereon; graduations dividing said orbit into sections representing the months of the year and days of the months; and an adjustable member coöperating with said orbit divided into segments representing the seasons of the year and movable to bring said season segments into registration with the month sections comprising the different seasons and into registration with the days graduations marking the astronomical commencement and close of the seasons.

2. An educational device comprising, in combination, a chart having the earth's orbit marked thereon; graduations dividing said orbit into sections representing the months of the year and days of the month; and an adjustable member divided into segments chromatically differentiated from one another graphically to represent the seasons of the year and movable to bring said season segments into registration with the months sections comprising the different seasons and into registration with the days graduations marking the astronomical commencement and close of the seasons.

3. An educational device comprising, in combination, a chart provided with a portion having the earth's orbit marked thereon; graduations dividing said orbit into sections representing the months of the year and days of the month, an adjustable member filling a central opening in said chart and divided into segments representing the seasons of the year; and means providing a pivotal support for said member whereby the latter may be moved to bring said season segments into registration with the months sections comprising the different seasons and into registration with the days graduations marking the astronomical commencement and close of the seasons.

4. An educational device comprising, in combination, a chart having the earth's orbit marked thereon; graduations dividing said orbit into sections representing the months of the year; graduations for said month sections representing the days of the month; and an index element adapted to be placed in any of a series of holes on said orbit corresponding to the days graduations.

In testimony whereof, I have signed my name to this specification, in the presence of two subscribing witnesses.

LIZZIE L. MOULTON.

Witnesses:
 JOHN R. MOULTON,
 HENRY T. WILLIAMS.

---

Copies of this patent may be obtained for five cents each, by addressing the "Commissioner of Patents, Washington, D. C."